Jan. 18, 1966     N. F. HARWOOD ETAL     3,229,558
BLOWN ARTICLE HOLDING AND DE-FLASHING DEVICE
Filed April 4, 1963     3 Sheets-Sheet 3

United States Patent Office 3,229,558
Patented Jan. 18, 1966

3,229,558
BLOWN ARTICLE HOLDING AND DE-FLASHING DEVICE
Norman Frederick Harwood, Claygate, and Alan John Osborne, Cheam, England, assignors to Baker Perkins Inc., Saginaw, Mich., a corporation of New York
Filed Apr. 4, 1963, Ser. No. 270,707
13 Claims. (Cl. 83—454)

The present invention relates to blow moulding apparatus and in particular to a blown article holding and de-flashing device for use in such apparatus.

According to the invention there is provided for use in apparatus for blow moulding hollow articles with end necks, a holding and de-flashing device including relatively movable complementary jaws arranged to hold and deflash an article neck, relatively movable article support members for engaging under the article end remote from the neck and complementary flash removing members operable in conjunction with said article support members to remove flash from the supported article end.

Figure 1:
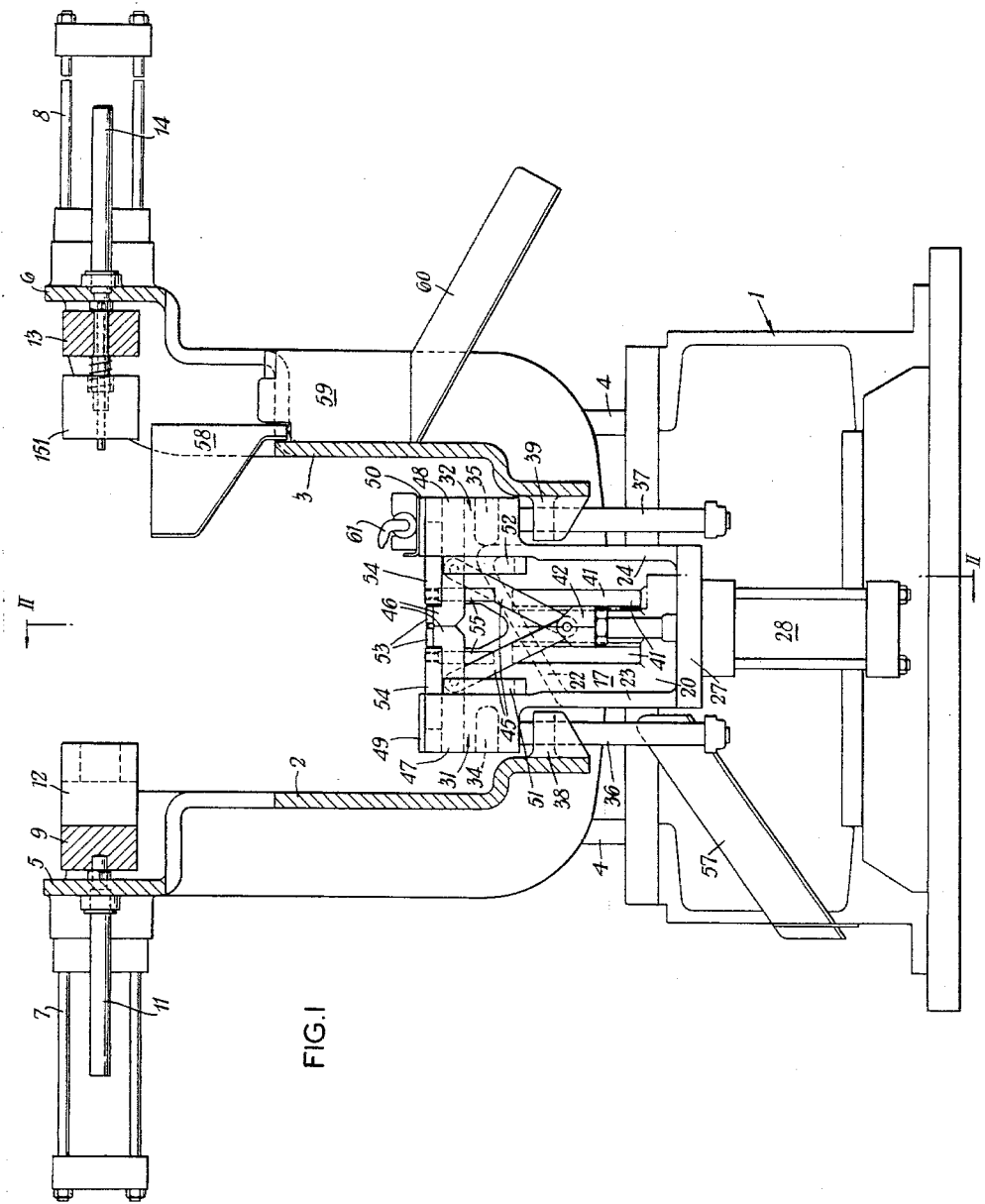
Figure 2:
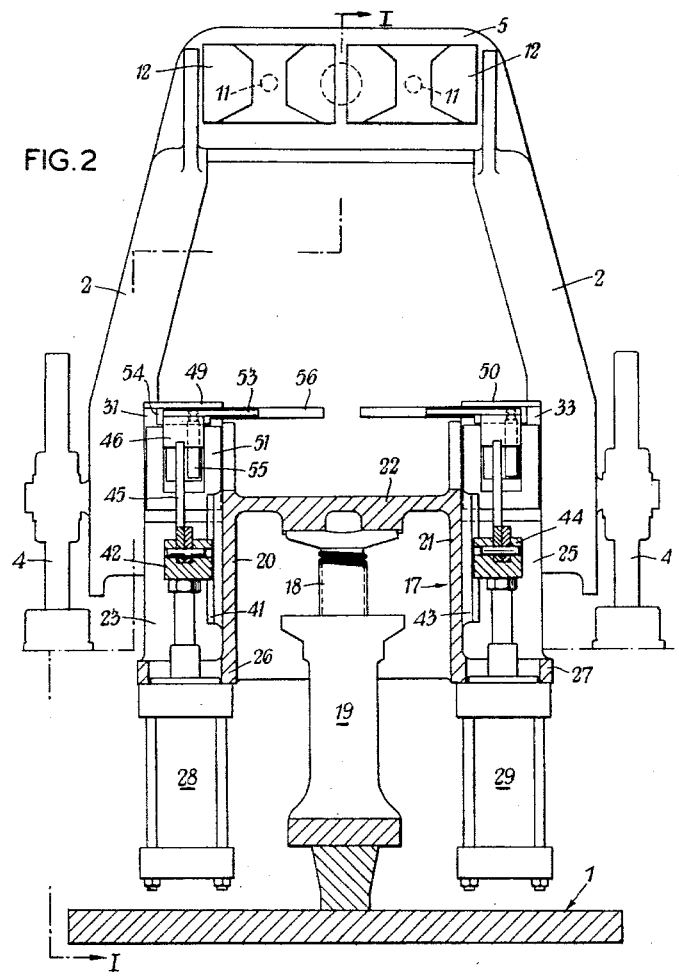
Figure 3:
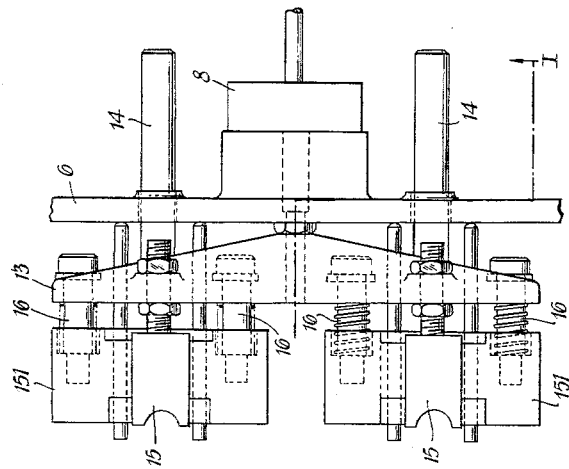
Figure 3:
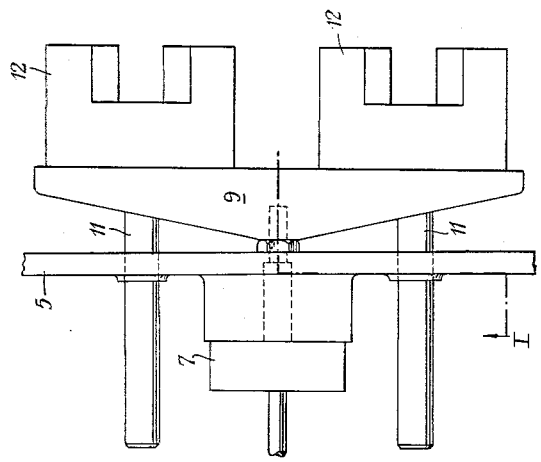

One construction of blown article holding and de-flashing device, in accordance with the invention, will now be described by way of example with reference to the accompanying drawings, in which FIGURE 1 illustrates a sectional elevation of the device, the section being taken on the line I—I in FIGURES 2 and 3, FIGURE 2 shows a section taken on the line II—II in FIGURE 1, and FIGURE 3 shows a fragmentary plan view on the device as shown in FIGURE 1.

The device is intended for use with blow moulding apparatus in which two tubes of plastic material are extruded downwards between mould halves and over blowing spigots positioned beneath the extruder head, the mould halves then being closed and blowing taking place whilst the mould is removed from its position adjacent the extruder head. At a position remote from that adjacent the extruder head, the mould is opened and the spigots rotated so that the blown articles, in this case bottles, project downwardly from the spigots.

The holding and de-flashing device of the invention is so positioned that it will accept blown bottles depending from the spigots and is operative to hold and de-flash the articles, whilst the mould haves and blowing spigots return to the position adjacent the extruder head.

Referring now to the drawings, the device includes a main supporting structure 1 (only partly shown in FIGURE 2) which carries two opposed pairs of upwardly extending arms, the arms of the respective pairs being referenced 2 and 3. The arms 2 and 3 are each secured to the structure 1 by means of support rods 4. At their upper ends the arms 2 are bridged by a plate 5 which provides a mounting for a pneumatic piston and cylinder assembly 7 and similarly the arms 3 are bridged by a plate 6 providing a mounting for a hydraulic piston and cylinder assembly 8. A bar 9 is attached to the piston of the pneumatic assembly 7 and is provided with rods 11 which loosely extend through the plate 5 so as to guide the bar 9 during rectilinear displacement thereof upon actuation of the pneumatic assembly 7. The bar 9 carries two shaped blocks 12 for engaging the bottles, depending side by side from the spigots, about their necks. A bar 13 is similarly attached to the piston of the pneumatic assembly 8 and is provided with rods 14 extending loosely through the plate 6 so as to guide the bar 13 during rectilinear displacement thereof upon actuation of the hydraulic assembly 8. The bar 13 also carries blocks 15 surrounded by spring loaded blocks 151. The blocks 151 are mounted on spring units 16 whereby the blocks 151 may be displaced towards the bar 13 against the action of the springs of the units 16. The function of the blocks 12 and the blocks 15 together with the blocks 151 is to engage the bottle necks as the pneumatic assemblies 7 and 8 are actuated to advance the bars 9 and 13 mutually towards one another. The necks of the bottles are gripped between the blocks 12 and the blocks 15, which engage in the blocks 12, the blocks 12 and 15 constituting complementary jaws. Furthermore the leading edge surfaces of the blocks 12, in closing on to the blocks 151, grip any flash therebetween and remove it on depressing the blocks 151 relative to the blocks 15.

The device also includes flash removing means located so as to grip and remove flash from the lower ends of the bottles which means comprise a subsidiary support in the form of a casting 17 which is supported on the piston rod 18 of a hydraulic jack 19 mounted on the main supporting structure 1. The casting is composed of two side walls 20 and 21 and an interconnecting sloping wall 22. The casting is further composed of four end walls arranged in pairs respectively projecting outwardly from the side walls 20 and 21. The end walls projecting from the side wall 20 are referenced 23 and 24 respectively. Only one of the end walls associated with the side wall 21 is shown in the drawings and is referenced 25. At their lower ends the end walls merge with flanges 26 and 27 projecting from the side walls 20 and 21 respectively. The flanges 26 and 27 are apertured and respectively carry hydraulic piston and cylinder assemblies 28 and 29. At their upper ends the end walls merge with blocks which, for the walls 23 to 25, are referenced 31 to 33 respectively. The blocks 31 and 32 are cut-away at 34 and 35 to provide flanges to which are attached the ends of guide rods 36 and 37 slidably extending through lugs 38 and 39 provided on the associated arms 2 and 3. The casting is provided with two further similar guide rods on the other side of the jack 19 which are attached to flanges in the blocks associated with the side wall 21. These latter rods guide the casting 17 during vertical adjustment of this casting by means of the jack 19.

The side wall 20 carries a pair of parallel guide plates 41 which define a guide for a slider block 42 attached to the end of the piston rod of the hydraulic assembly 28. The side wall 21 similarly carries two guide plates 43 (only one of which is shown) for a slider block 44 associated with the hydraulic assembly 29. The slider block 42 is coupled by a pair of toggle links 45 to a pair of blade support blocks 46 which are slidable in channels 47 and 48 provided in the blocks 31 and 32 respectively. The upper ends of the channels are respectively closed by cover plates 49 and 50. The arrangement is such that with the piston rod of the assembly 28 initially in a fully ejected position, the blocks 46 are firstly drawn together as the aforesaid piston rod is retracted. The blocks are dimensioned so that as their inner or front faces meet, their opposite or rear faces clear the respective channels 47 and 48. Therefore continued retraction of the piston rod effects a sliding of the blocks 46 down the inner wall surfaces of the walls 23 and 24. During this latter movement, the blocks are constrained by U-shaped guides 51 and 52 mounted respectively on the walls 23 and 24. Downward movement of the blocks 46 will be terminated as the blocks abut the bases of the U-shaped guides. The blocks 46 carry blades 53 the purpose of which is to grip and remove flash present on the bottom end of the articles as the blocks close and then descend. Furthermore each block 46 is associated with a bottle support block 54 which are also slidable in the respective channels 47 and 48 and are each supported on shoulders within these channels. The blocks 54 carry pegs 55 which loosely pass through the blocks 46 so that as the latter blocks are drawn together, the blocks 54 similarly close towards one another. Furthermore the pegs 55 permit the blocks 46 to move away from the blocks 54 during flash removal. It should be stated that the blocks 54 are dimensioned so that in their advanced position shown in FIGURE 1 a substantial portion of their length still remains within the guide channels and the blocks are thus supported cantilever fashion between the respective shoulders and cover plates. The blocks 54 carry rods 56 for supporting the bottles during flash removal.

The slider 44 is arranged to operate a similar mechanism to that referenced 45 to 56 which mechanism will not be described in detail. This mechanism is, as will be seen from FIGURES 1 and 2, arranged in mirror image fashion to the mechanism 45 to 55. The two mechanisms serve to remove bottom flash from the two bottles respectively.

The device includes a chute 57 to carry bottom flash from the articles away from the supporting structure 1 and a further chute composed of parts 58, 59 and 60 for deflecting flash removed from the necks of the bottles away from the bottom flash removing means.

In operation of the device after the spigots carrying the blown bottles have been rotated so that the bottles project downwardly from the spigots, the pneumatic assemblies 7 and 8 are actuated to advance the bars 9 and 13 and at the same time the pneumatic assemblies 28 and 29 are actuated. Actuation of the assemblies 7 and 8 effects, as described above, holding of the bottles and removal of the neck flash, and at the other ends of the bottles the support rods 56 are closed towards one another to provide a support for the lower ends of the bottles and simultaneously the blades 53 close to grip the bottom flash. Thereafter the blades lower to remove the flash. During this latter stage the rods 56 provide adequate support for the bottles. The holding of the bottles about their necks prevents any possible upward movement of the article which is an obvious advantage in this case where the spigot is to be withdrawn upwardly from the neck as the mould assembly and blowing spigots return to the positions adjacent the extruder head. The pneumatic assemblies are finally reversed to return the neck flash removing mechanism to the position shown in FIGURE 3 and to raise the blocks 46 for subsequent return outwardly along the channels 47 and 48.

The bottles may then be removed from the device by any suitable means which may, for example, comprise a compressed air nozzle 61 from which a jet of air can be directed on to the bottles to throw them away from the device.

The provision of the jack 19 enables the vertical position of the complete mechanism mounted on the casting 17 to be adjusted so as to cater for varying lengths of bottle.

Whilst pneumatic actuation has been described this could be hydraulic, or in fact any suitable form of drive can be utilised.

We claim:

1. An article holding and deflashing device for use with apparatus for moulding a hollow article having a neck at one end, said device comprising a pair of complementary jaws; means for supporting said article with its neck between said jaws; means mounting said jaws for relative movement from a first position out of holding relation with said neck to a second position in holding relation with said neck; means operable in response to relative movement of said jaws toward said second position to deflash said neck; and means for effecting said relative movement of said jaws.

2. The construction set forth in claim 1 wherein one of said jaws is larger than the other for telescopingly accommodating the other of said jaws as said jaws move relatively toward said second position, the edges of said larger jaws constituting the means to deflash said neck.

3. The construction set forth in claim 2 including a displaceable block surrounding said other of said jaws; and yieldable means acting on said block to enable its displacement by said larger of said jaws as said jaws move relatively toward said second position.

4. The construction set forth in claim 1 including complementary flash removing members adjacent and cooperable with said article supporting means for removing flash from said article remote from said neck.

5. The construction set forth in claim 4 wherein said flash removing members comprise a pair of spaced apart, relatively movable blades; means mounting said blades for movement toward one another to grip flash therebetween; means for moving said blades toward one another; and means for further moving said blades relatively to said supporting means while said blades are in flash gripping relation to withdraw flash from said article.

6. The construction set forth in claim 5 wherein the mounting means for said blades comprises a pair of blocks slideably mounted in said supporting means and respectively connected to said blades.

7. The construction set forth in claim 6 wherein the means for moving said blades toward one another comprises movable link means connected to said blocks; and means for moving said link means.

8. The construction set forth in claim 6 wherein the means for further moving said blades comprises movable link means connected to said blocks; and means for moving said link means.

9. The construction set forth in claim 6 wherein the respective means for moving said blades toward one another and for further moving said blades comprises a toggle link mechanism connected to said blocks; and means for operating said mechanism.

10. The construction set forth in claim 1 including means for adjusting said article supporting means to cater for varying article lengths.

11. A deflashing device for removing flash from a moulded article, said device comprising means for supporting said article; a pair of spaced apart blades; means slideably mounting said blades on said support for sequential movements first toward one another to grip flash therebetween and then in a direction to remove the gripped flash from said article; link means; means connecting said link means to said blades; and operating means connected to said link means for moving the latter to impart said sequential movements to said blades.

12. The construction set forth in claim 11 wherein said link means comprises a toggle link mechanism.

13. An article holding and deflashing device for use with apparatus for moulding an article having a neck at one end and a bottom at the other end, said device comprising a pair of complementary jaws; means for supporting said article with its neck between said jaws; means mounting said jaws for relative movement from a first position out of holding relation with said neck to a second position in holding relation with said neck; means operable in response to relative movement of said jaws toward said second position to deflash said neck; a pair of spaced apart blades; means slideably mounting said blades in a position adjacent the bottom of said article for sequential movements first toward one another to grip flash therebetween, and then in a direction to remove the gripped flash from the bottom of said article; and operating means connected to said jaws and to said blades for moving said jaws toward one another simultaneously with the movement of said blades toward one another.

References Cited by the Examiner

UNITED STATES PATENTS 3,038,200   6/1962   Whitbourn.
3,040,376   6/1962   Elphee.

WILLIAM W. DYER, Jr., *Primary Examiner.*

WILLIAM S. LAWSON, *Examiner.*